US012340732B2

(12) United States Patent
Wu et al.

(10) Patent No.: US 12,340,732 B2
(45) Date of Patent: Jun. 24, 2025

(54) PIXEL DRIVING CIRCUIT WITH PULSE AMPLITUDE AND WIDTH MODULATION, DRIVING METHOD THEREOF, AND DISPLAY PANEL

(71) Applicant: Shenzhen China Star Optoelectronics Semiconductor Display Technology Co., Ltd., Guangdong (CN)

(72) Inventors: Yanyan Wu, Guangdong (CN); Lijun Zhang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/491,774

(22) Filed: Oct. 22, 2023

(65) Prior Publication Data

US 2025/0061839 A1 Feb. 20, 2025

(30) Foreign Application Priority Data

Aug. 18, 2023 (CN) ......................... 202311044976.4

(51) Int. Cl.
*G09G 3/32* (2016.01)

(52) U.S. Cl.
CPC ....... *G09G 3/32* (2013.01); *G09G 2300/0852* (2013.01); *G09G 2310/0262* (2013.01); (Continued)

(58) Field of Classification Search
CPC ... G09G 3/32-3241; G09G 2300/0852; G09G 2310/0262; G09G 2320/0233
See application file for complete search history.

(56) References Cited

U.S. PATENT DOCUMENTS 10,004,124 B1 6/2018 Ko
2018/0293929 A1 10/2018 Shigeta et al.
(Continued)

FOREIGN PATENT DOCUMENTS

CN 111341252 A 6/2020
CN 113096589 A 7/2021
(Continued)

OTHER PUBLICATIONS

Eurasian Office Action issued in corresponding Eurasian Patent Application No. 202393203 dated Jan. 11, 2024, pp. 1.
(Continued)

*Primary Examiner* — Liliana Cerullo
(74) *Attorney, Agent, or Firm* — Nathan & Associates Patent Agents Ltd.; Menachem Nathan

(57) ABSTRACT

The invention provides a pixel driving circuit, a driving method thereof, and a display panel. The pixel driving circuit includes electrically connected light emitting device, driving transistor, pulse amplitude modulation module, and pulse width modulation module. The driving transistor generates a driving current to drive the light emitting device to emit light, and the pulse amplitude modulation module is configured to output a pulse amplitude modulation voltage to the driving transistor to control an amplitude of the driving current. The pulse width modulation module is configured to control a duration for which the driving transistor outputs the driving current based on a swept frequency voltage. By combining the pulse amplitude modulation module and the pulse width modulation module, uniformity of the display panel is compensated without the need to set up an external compensation circuit, which is beneficial to reducing power consumption. The display panel includes the pixel driving circuit.

15 Claims, 9 Drawing Sheets

(52) U.S. Cl.
CPC . *G09G 2310/08* (2013.01); *G09G 2320/0219* (2013.01); *G09G 2320/0233* (2013.01); *G09G 2330/021* (2013.01)

(56) References Cited

U.S. PATENT DOCUMENTS

| | | | | |
|---|---|---|---|---|
| 2019/0295463 | A1* | 9/2019 | Ling | G09G 3/3225 |
| 2020/0111403 | A1 | 4/2020 | Kim | |
| 2020/0394953 | A1 | 12/2020 | Kim | |
| 2022/0101783 | A1 | 3/2022 | Han et al. | |
| 2023/0104084 | A1 | 4/2023 | Yang et al. | |
| 2023/0316987 | A1* | 10/2023 | Zhai | G09G 3/32<br>345/214 |

FOREIGN PATENT DOCUMENTS

| | | | |
|---|---|---|---|
| CN | 113707077 | A | 11/2021 |
| CN | 113889034 | A | 1/2022 |
| CN | 114299864 | A | 4/2022 |

OTHER PUBLICATIONS

European Office Action issued in corresponding European Patent Application No. 23204698.7 dated Feb. 16, 2024, pp. 1-15.

Japanese Office Action issued in corresponding Japanese Patent Application No. 特願 2023-196284 dated Aug. 6, 2024, pp. 1-6.

* cited by examiner

PIXEL DRIVING CIRCUIT WITH PULSE AMPLITUDE AND WIDTH MODULATION, DRIVING METHOD THEREOF, AND DISPLAY PANEL

CROSS REFERENCE TO RELATED APPLICATIONS

This application claims priority to Chinese Patent Application No. 202311044976.4, filed on Aug. 18, 2023, and entitled "PIXEL DRIVING CIRCUIT, DRIVING METHOD THEREOF, AND DISPLAY PANEL". The entire disclosures of the above application are incorporated herein by reference.

TECHNICAL FIELD

The present application relates to the field of display technology, in particular to a pixel driving circuit, a driving method thereof, and a display panel.

BACKGROUND

Display panels that use micro light-emitting diodes or sub-millimeter light-emitting diodes to achieve direct display technology have technical problems with poor low gray-scale uniformity. In order to improve issues of poor uniformity of low gray levels, external compensation circuits are often used for compensation. However, the power consumption of the external compensation circuit is relatively high.

SUMMARY

Embodiments of the present invention provide a pixel driving circuit, a driving method thereof, and a display panel, which can improve uniformity of a display panel and reduce power consumption.

An embodiment of the present invention provides a pixel driving circuit comprising a light emitting device, a driving transistor, a pulse amplitude modulation module, and a pulse width modulation module. The light emitting device is electrically connected between a first node and a first voltage terminal. The driving transistor is electrically connected to the first node, a second node, and a second voltage terminal, and the driving transistor is configured to generate a driving current to drive the light emitting device to emit light. The pulse amplitude modulation module is electrically connected to the driving transistor and configured to output a pulse amplitude modulation voltage to the driving transistor to control an amplitude of the driving current. The pulse width modulation module is electrically connected to the second node, the second voltage terminal, and the pulse amplitude modulation module and is configured to control a duration of the driving transistor outputting the driving current according to a sweep voltage.

Optionally, in some embodiments of the invention, a control terminal of the driving transistor is electrically connected to the second node, an input terminal of the driving transistor is electrically connected to the light emitting device, and an output terminal of the driving transistor is electrically connected to the second voltage terminal.

Optionally, in some embodiments of the invention, the pulse amplitude modulation module comprises a first compensation transistor, a first reset transistor, a first data transistor, a first capacitor, and a second capacitor. A control terminal of the first compensation transistor is electrically connected to a compensation control line, an input terminal of the first compensation transistor is electrically connected to the first node, and an output terminal of the first compensation transistor is electrically connected to the second node. A control terminal of the first reset transistor is electrically connected to a first reset control line, an input terminal of the first reset transistor is electrically connected to the second voltage terminal, and an output terminal of the first reset transistor is electrically connected to a third node. A control terminal of the first data transistor is electrically connected to a pulse amplitude control line, an input terminal of the first data transistor is electrically connected to a data line, and an output terminal of the first data transistor is electrically connected to the third node. The first capacitor is connected in series between the second node and the second voltage terminal. The second capacitor is connected in series between the second node and the third node.

Optionally, in some embodiments of the invention, the pulse amplitude modulation module further comprises a second reset transistor. A control terminal of the second reset transistor is electrically connected to a second reset control line, an input terminal of the second reset transistor is electrically connected to the data line, and an output terminal of the second reset transistor is electrically connected to the second node.

Optionally, in some embodiments of the invention, the control terminal of the first reset transistor is electrically connected to the control terminal of the second reset transistor through the first reset control line, or the control terminal of the first reset transistor is electrically connected to the control terminal of the first compensation transistor through the first reset control line.

Optionally, in some embodiments of the invention, the pulse width modulation module comprises a first switching transistor, a second switching transistor, a second compensation transistor, a third reset transistor, a second data transistor, a third capacitor, and a fourth capacitor. A control terminal of the first switching transistor is electrically connected to a lighting control line, and an output terminal of the first switching transistor is electrically connected to the second node. An input terminal of the second switching transistor is electrically connected to the second voltage terminal, and an output terminal of the second switching transistor is electrically connected to the input terminal of the first switching transistor. A control terminal of the second compensation transistor is electrically connected to a compensation control line, and an input terminal and an output terminal of the second compensation transistor are electrically connected between the output terminal and the control terminal of the second switching transistor. A control terminal of the third reset transistor is electrically connected to the control terminal of the second compensation transistor, an input terminal of the third reset transistor is electrically connected to the second voltage terminal, and an output terminal of the third reset transistor is electrically connected to the fourth node. A control terminal of the second data transistor is electrically connected to a pulse width control line, an input terminal of the second data transistor is electrically connected to the data line, and an output terminal of the second data transistor is electrically connected to the fourth node. The third capacitor is connected in series between the fourth node and the control terminal of the second switching transistor. The fourth capacitor is connected in series between a frequency sweep control line transmitting the frequency sweep voltage and the fourth node.

Optionally, in some embodiments of the invention, the pulse width modulation module further comprises a fourth reset transistor. A control terminal of the fourth reset transistor is electrically connected to a second reset control line, an input terminal of the fourth reset transistor is electrically connected to the data line, and an output terminal of the fourth reset transistor is electrically connected to the control terminal of the second switching transistor.

Optionally, in some embodiments of the invention, the first voltage signal transmitted by the first voltage terminal has a first voltage value when the first switching transistor is turned on, and the first voltage signal has a second voltage value when the first switching transistor is turned off, and the first voltage value is greater than the second voltage value.

Optionally, in some embodiments of the invention, the pixel driving circuit further comprises a third switching transistor. A control terminal of the third switching transistor is electrically connected to the light emitting control line, and an input terminal and an output terminal of the third switching transistor are electrically connected between the first voltage terminal and the light emitting device.

Embodiments of the present invention provide a driving method of a pixel driving circuit configured to drive any of the above pixel driving circuits including transmitting the pulse amplitude modulation voltage to the driving transistor through the pulse amplitude modulation module, such that the driving transistor controls the amplitude of the driving current according to the pulse amplitude modulation voltage; and receiving the sweep voltage through the pulse width modulation module to control a moment when the driving transistor stops outputting the driving current and control the duration of the driving transistor outputting the driving current.

Optionally, in some embodiments of the invention, an operation cycle of driving the pixel driving circuit comprises a reset phase, a detection and compensation phase, a data writing phase, and a light emitting phase, wherein during the reset phase, the driving transistor is turned on, a first voltage signal transmitted by the first voltage terminal has a second voltage value in the reset phase, the detection compensation phase, and the data writing phase; wherein in the light emitting phase, the first voltage signal transmitted by the first voltage terminal has a first voltage value.

Optionally, in some embodiments of the invention, the first voltage value is greater than the second voltage value.

The present invention further provides a display panel including any one of the above-mentioned pixel driving circuits.

The invention provides a pixel driving circuit, a driving method thereof, and a display panel. The pixel driving circuit includes electrically connected light emitting device, driving transistor, pulse amplitude modulation module, and pulse width modulation module. The driving transistor generates a driving current to drive the light emitting device to emit light, and the pulse amplitude modulation module is configured to output a pulse amplitude modulation voltage to the driving transistor to control an amplitude of the driving current. The pulse width modulation module is configured to control a duration for which the driving transistor outputs the driving current based on a swept frequency voltage. By combining the pulse amplitude modulation module and the pulse width modulation module, uniformity of the display panel is compensated without the need to set up an external compensation circuit, which is beneficial to reducing power consumption.

BRIEF DESCRIPTION OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present application. For those skilled in the art, other drawings can also be obtained based on these drawings without any creative effort.

DETAILED DESCRIPTION OF ILLUSTRATED EMBODIMENTS

Figure 1A:
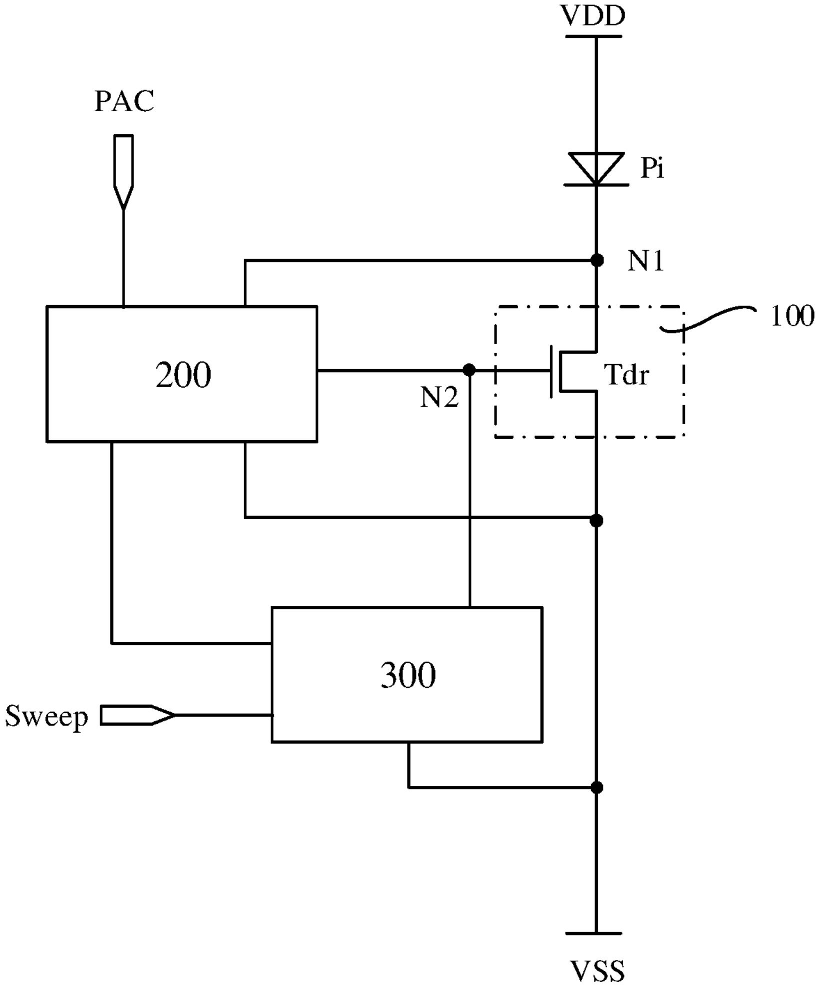
FIG. 1A to FIG. 1E are schematic structural diagrams of pixel driving circuits provided by embodiments of the present invention.

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention. In addition, it should be understood that the specific embodiments described here are only used to illustrate and explain the present invention and are not intended to limit the present invention. In the present invention, unless stated otherwise, the used orientation words such as "up" and "down" usually refer to the up and down of the device in actual use or working state, specifically the directions in the drawings. The "inside" and "outside" refer to the outline of the installation.

Specifically, FIG. 1A to FIG. 1E are schematic structural diagrams of pixel driving circuits provided by embodiments of the present invention. The present invention provides a pixel driving circuit, which includes a light emitting device Pi, a driving module 100, a pulse amplitude modulation module 200, and a pulse width modulation module 300.

The light emitting device Pi is electrically connected between a first node N1 and a first voltage terminal VDD. Optionally, an anode of the light emitting device Pi is electrically connected to the first voltage terminal VDD, and a cathode of the light emitting device Pi is electrically connected to the first node N1.

Optionally, the light emitting device Pi includes at least one of an organic light emitting diode, a sub-millimeter light emitting diode, and a micro light emitting diode.

The driving module 100 is electrically connected to the first node N1, the second node N2, and a second voltage terminal VSS. The driving module 100 is configured to generate a driving current to drive the light emitting device Pi to emit light.

Optionally, continue to refer to FIG. 1B to FIG. 1E, the driving module 100 includes a driving transistor Tdr. A control terminal of the driving transistor Tdr is electrically connected to the second node N2. An input terminal of the driving transistor Tdr is electrically connected to the light emitting device Pi. An output terminal of the driving transistor Tdr is electrically connected to the second voltage terminal VSS.

The pulse amplitude modulation module 200 is electrically connected to the driving transistor Tdr. The pulse amplitude modulation module 200 is configured to transmit a pulse amplitude modulation voltage VPAM to the driving transistor Tdr according to a pulse amplitude control signal PAC, so that the driving transistor Tdr controls an amplitude of the driving current according to the pulse amplitude modulation voltage VPAM.

Optionally, the pulse amplitude modulation module 200 includes a first compensation unit and a first data unit. The first compensation unit is electrically connected to the driving module 100, and the first compensation unit is configured to detect and compensate the threshold voltage of the driving transistor Tdr. The first data unit is electrically connected to the driving module 100 through the first compensation unit to transmit the pulse amplitude modulation voltage VPAM to the driving module 100 according to the pulse amplitude control signal PAC.

Optionally, continue to refer to FIG. 1A to FIG. 1E, the first compensation unit includes a first compensation transistor Tc1, a first reset transistor Ti1, a first capacitor C1, and a second capacitor C2.

A control terminal of the first compensation transistor Tel is electrically connected to a compensation control line CoL. An input terminal of the first compensation transistor Tc1 is electrically connected to the first node N1. An output terminal of the first compensation transistor Tc1 is electrically connected to the second node N2. The first compensation transistor Tc1 is configured to make the driving transistor Tdr diode-connected according to a compensation control signal Comp transmitted by the compensation control line CoL.

Figure 1B:
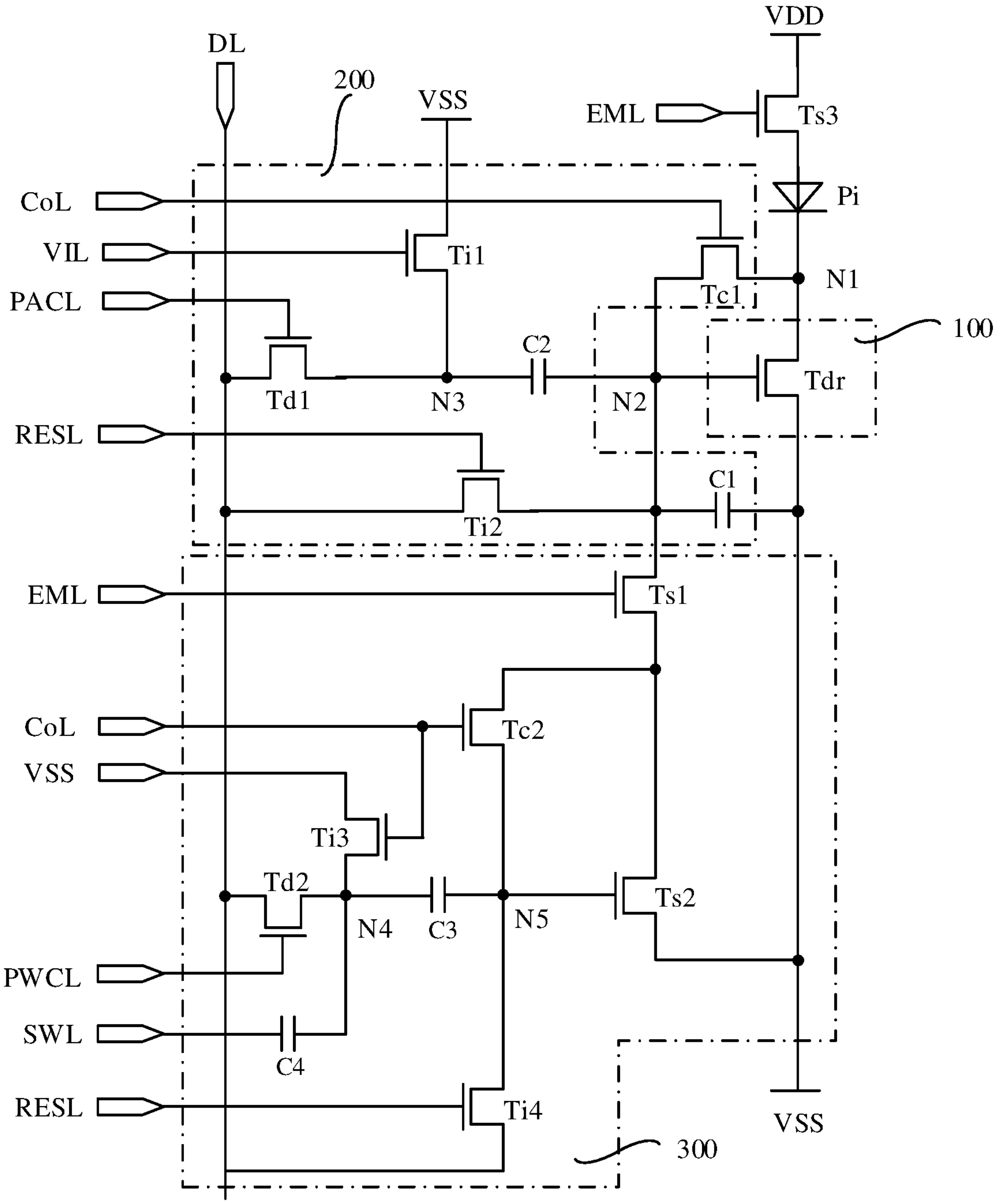

Continue to refer to FIG. 1B, a control terminal of the first reset transistor Ti1 is electrically connected to a first reset control line VIL. An input terminal of the first reset transistor Ti1 is electrically connected to the second voltage terminal VSS. An output terminal of the first reset transistor Ti1 is electrically connected to the third node N3. The first reset transistor Ti1 is configured to transmit the second voltage signal Vss output by the second voltage terminal VSS to the third node N3 according to the first reset control signal VI1 transmitted by the first reset control line VIL, to reset the potential of the third node N3.

Optionally, in the reset phase of resetting the first node N1, and in the detection compensation phase of detecting to facilitate compensation of the threshold voltage of the driving transistor Tdr, the first reset control signal VI1 can control the first reset transistor Ti1 to maintain a conductive state. While eliminating the potential information written at the second node N2 in the previous frame, keep the potential of the second node N2 stable and prevent the threshold voltage of the driving transistor Tdr from being written into the second node N2. In the light emitting phase when the driving transistor Tdr drives the light emitting device Pi to emit light, a threshold voltage of the driving transistor Tdr can be fully compensated.

Figure 1C:
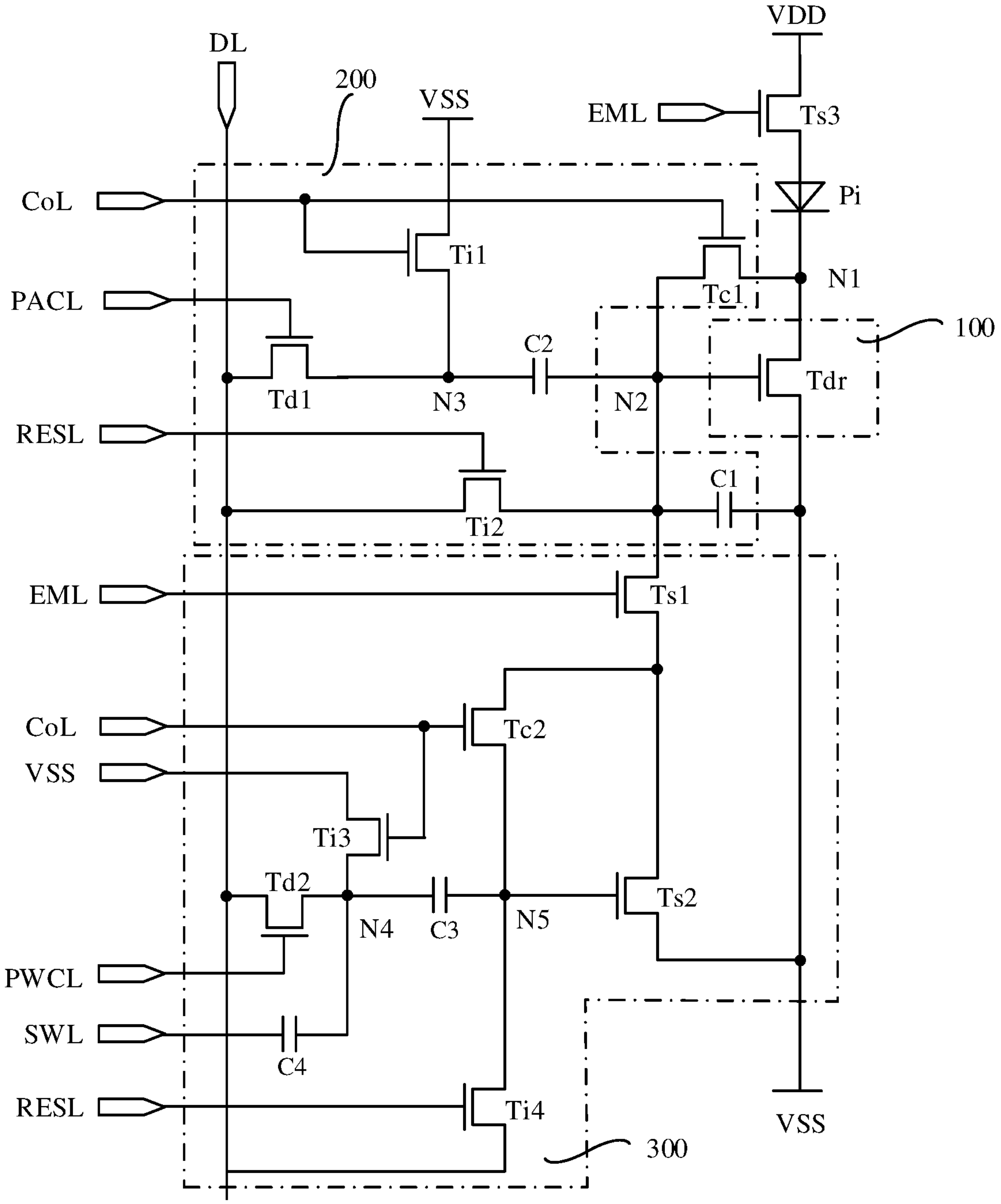

Optionally, in order to reduce the number of signals applied by the pixel driving circuit, save the number of signal lines used by the pixel driving circuit, and save layout space, the control terminal of the first reset transistor Ti1 is electrically connected to the control terminal of the first compensation transistor Tc1 through the first reset control line VIL, such that the first reset transistor Ti1 and the first compensation transistor Tc1 are turned on or off according to the same control signal (that is, the first reset transistor Ti1 and the first compensation transistor Tc1 are both turned on or off according to the compensation control signal Comp And on or off), as shown in FIG. 1C.

The first capacitor C1 is connected in series between the second node N2 and the second voltage terminal VSS. The second capacitor C2 is connected in series between the second node N2 and the third node N3. The first capacitor C1 and the second capacitor C2 are configured to store the threshold voltage of the driving transistor Tdr when the first reset transistor Ti1 and the first compensation transistor Tc1 are turned on, the threshold voltage of the driving transistor Tdr is compensated by using the threshold voltage of the driving transistor Tdr stored by the first capacitor C1 and the second capacitor C2 during the light emitting phase. Therefore, the driving current generated by the driving transistor Tdr is independent of the threshold voltage of the driving transistor Tdr, thereby improving a brightness uniformity of the light emitting device Pi.

Optionally, continue to refer to FIG. 1A to FIG. 1E, the pulse amplitude modulation module 200 further includes a second reset transistor Ti2. The control terminal of the second reset transistor Ti2 is electrically connected to the second reset control line RESL. The input terminal of the second reset transistor Ti2 is electrically connected to the data line DL. The output terminal of the second reset transistor Ti2 is electrically connected to the second node N2. The second reset transistor Ti2 is configured to transmit the first reset voltage Data_0 to the second node N2 according to the second reset control signal Res transmitted by the second reset control line RESL, and the potential of the second node N2 is reset, thereby eliminating the residual potential information of the previous frame on the second node N2. The first reset voltage Data_0 may be transmitted via the data line DL.

Figure 1D:
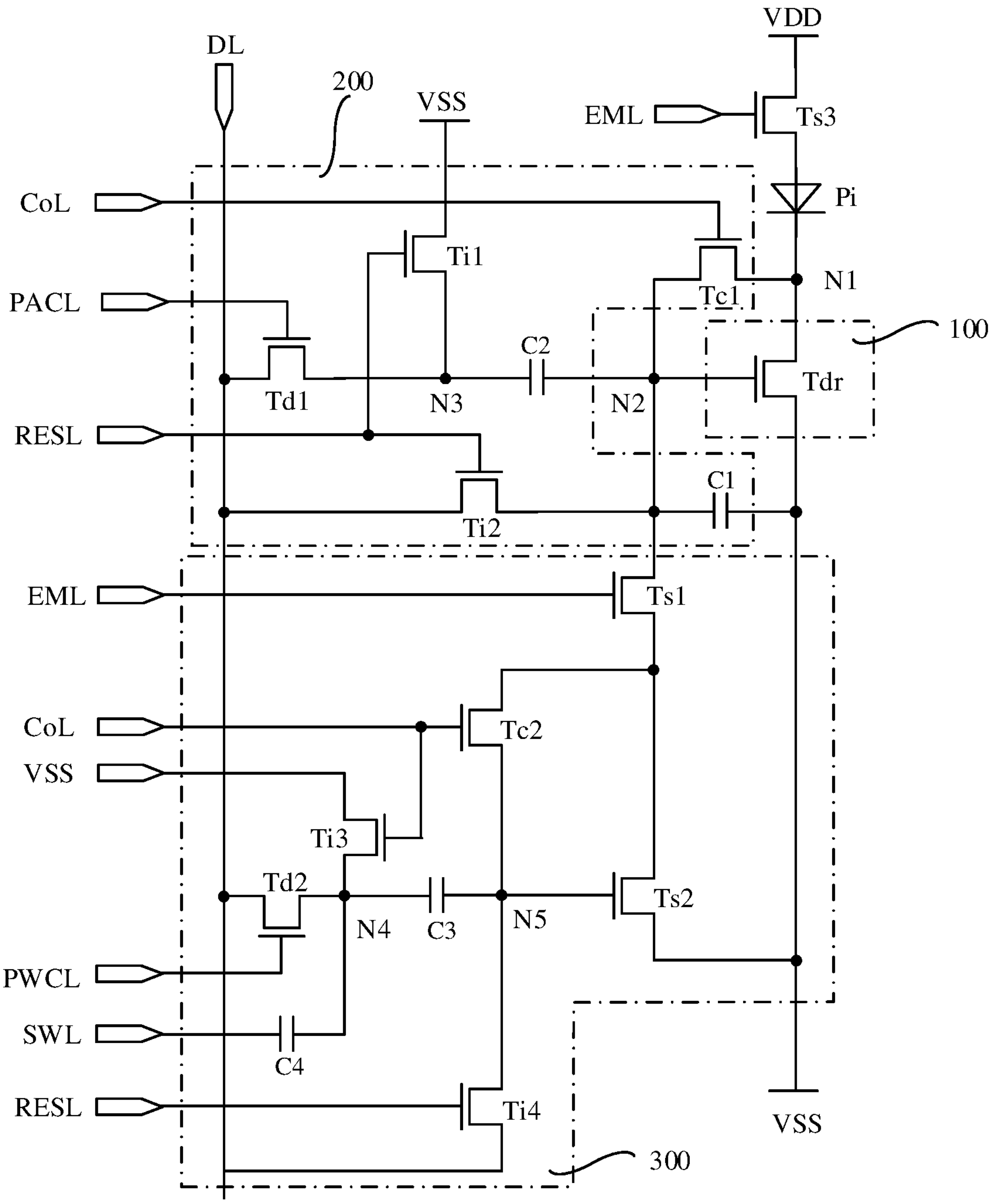

Optionally, in order to reduce the number of signals applied by the pixel driving circuit, save the number of signal lines used by the pixel driving circuit, and save layout space, the control terminal of the first reset transistor Ti1 is also electrically connected to the control terminal of the second reset transistor Ti2 through the first reset control line VIL, such that the first reset transistor Ti1 and the second reset transistor Ti2 are turned on or off according to the same control signal (that is, the first reset transistor Ti1 and the second reset transistor Ti2 are both turned on or off according to the second reset control signal Res), as shown in FIG. 1D.

Continue to refer to FIG. 1A to FIG. 1E, the first data unit includes a first data transistor Td1. The control terminal of the first data transistor Td1 is electrically connected to the pulse amplitude control line PACL. The input terminal of the first data transistor Td1 is electrically connected to the data line DL. The output terminal of the first data transistor Td1 is electrically connected to the third node N3. The first data transistor Td1 is configured to transmit the pulse amplitude modulation voltage VPAM transmitted by the data line DL to the third node N3 according to the pulse amplitude control signal PAC transmitted by the pulse amplitude control line PACL, and the potential of the second node N2 is coupled through the second capacitor C2 to control the conduction state and conduction degree of the driving transistor Tdr.

Continue to refer to FIG. 1A to FIG. 1E, the pulse width modulation module 300 is electrically connected to the second node N2, the second voltage terminal VSS, and the pulse amplitude modulation module 200. The pulse width modulation module 300 is configured as according to the frequency sweep voltage Sweep is equal to the time period for controlling the driving transistor Tdr to output the driving current.

Optionally, the pulse width modulation module 300 includes a first switching unit, a second switching unit, a second compensation unit, a second data unit, and a frequency sweep unit that are electrically connected. The first switching unit realizes the electrical connection between the second switching unit and the second node N2 according to the lighting control signal EM. The second switching unit is configured to transmit the second voltage signal Vss to the first switching unit. The second compensation unit is configured to detect and compensate the threshold voltage of the second switching transistor Ts2 included in the second switching unit. The second data unit is electrically connected to the second switching unit through the second compensation unit to transmit the pulse width modulation voltage VPWM to the second switching unit according to the pulse width control signal PWC.

Optionally, continue to refer to FIG. 1A to FIG. 1E, the first switching unit includes a first switching transistor Ts1. The control terminal of the first switching transistor Ts1 is electrically connected to the light emitting control line EML. The output terminal of the first switching transistor Ts1 is electrically connected to the second node N2.

Optionally, continue to refer to FIG. 1A to FIG. 1E, the second switching unit includes a second switching transistor Ts2. The input terminal of the second switching transistor Ts2 is electrically connected to the second voltage terminal VSS. The output terminal of the second switching transistor Ts2 is electrically connected to the input terminal of the first switching transistor Ts1. The second switching transistor Ts2 is configured to transmit the second voltage signal Vss to the input terminal of the first switching transistor Ts1.

Optionally, continue to refer to FIG. 1A to FIG. 1E, the second compensation unit includes a second compensation transistor Tc2, a third reset transistor Ti3, a third capacitor C3, and a fourth capacitor C4.

The control terminal of the second compensation transistor Tc2 is electrically connected to the compensation control line CoL. The input terminal and the output terminal of the second compensation transistor Tc2 are electrically connected between the output terminal and the control terminal of the second switching transistor Ts2. The second compensation transistor Tc2 is configured to cause the second switching transistor Ts2 to be diode-connected according to the compensation control signal Comp transmitted by the compensation control line CoL.

The control terminal of the third reset transistor Ti3 is electrically connected to the control terminal of the second compensation transistor Tc2. The input terminal of the third reset transistor Ti3 is electrically connected to the second voltage terminal VSS. The output terminal of the third reset transistor Ti3 is electrically connected to the fourth node N4. The third reset transistor Ti3 is configured to transmit the second voltage signal Vss to the fourth node N4 according to the compensation control signal Comp to reset the potential of the fourth node N4.

The third capacitor C3 is connected in series between the fourth node N4 and the control terminal of the second switching transistor Ts2, and the fourth capacitor C4 is connected in series between the frequency sweep control line SWL transmitting the frequency sweep voltage Sweep and the fourth node N4.

Optionally, continue to refer to FIG. 1A to FIG. 1E, the second data unit includes a second data transistor Td2. The control terminal of the second data transistor Td2 is electrically connected to the pulse width control line PWCL. The input terminal of the second data transistor Td2 is electrically connected to the data line DL. The output terminal of the second data transistor Td2 is electrically connected to the fourth node N4. The second data transistor Td2 is configured as the pulse width modulation voltage VPWM transmitted by the data line DL is transmitted to the fourth node N4 according to the pulse width control signal PWC transmitted by the pulse width control line PWCL, the potential of the control terminal of the second switching transistor Ts2 is coupled through the third capacitor C3, thereby controlling the conduction state and conduction degree of the second switching transistor Ts2.

Optionally, continue to refer to FIG. 1A to FIG. 1E, the pulse width modulation module 300 further includes a fourth reset transistor Ti4. The control terminal of the fourth reset transistor Ti4 is electrically connected to the second reset control line RESL. The input terminal of the fourth reset transistor Ti4 is electrically connected to the data line DL. The output terminal of the fourth reset transistor Ti4 is electrically connected to the control terminal of the second switching transistor Ts2. The fourth reset transistor Ti4 is configured as the first reset voltage Data_0 is transmitted to the control terminal of the second switching transistor Ts2 according to the second reset control signal Res to reset the potential of the control terminal of the second switching transistor Ts2.

Continue to refer to FIG. 1B to FIG. 1D, the pixel driving circuit also includes a third switching transistor Ts3. The control terminal of the third switching transistor Ts3 is electrically connected to the light emitting control line EML. The input terminal and the output terminal of the third switching transistor Ts3 are electrically connected between the first voltage terminal VDD and the light emitting device Pi. The third switching transistor Ts3 is configured as the first voltage terminal VDD and the light emitting device Pi are controlled to be electrically connected according to the lighting control signal EM.

Figure 1E:
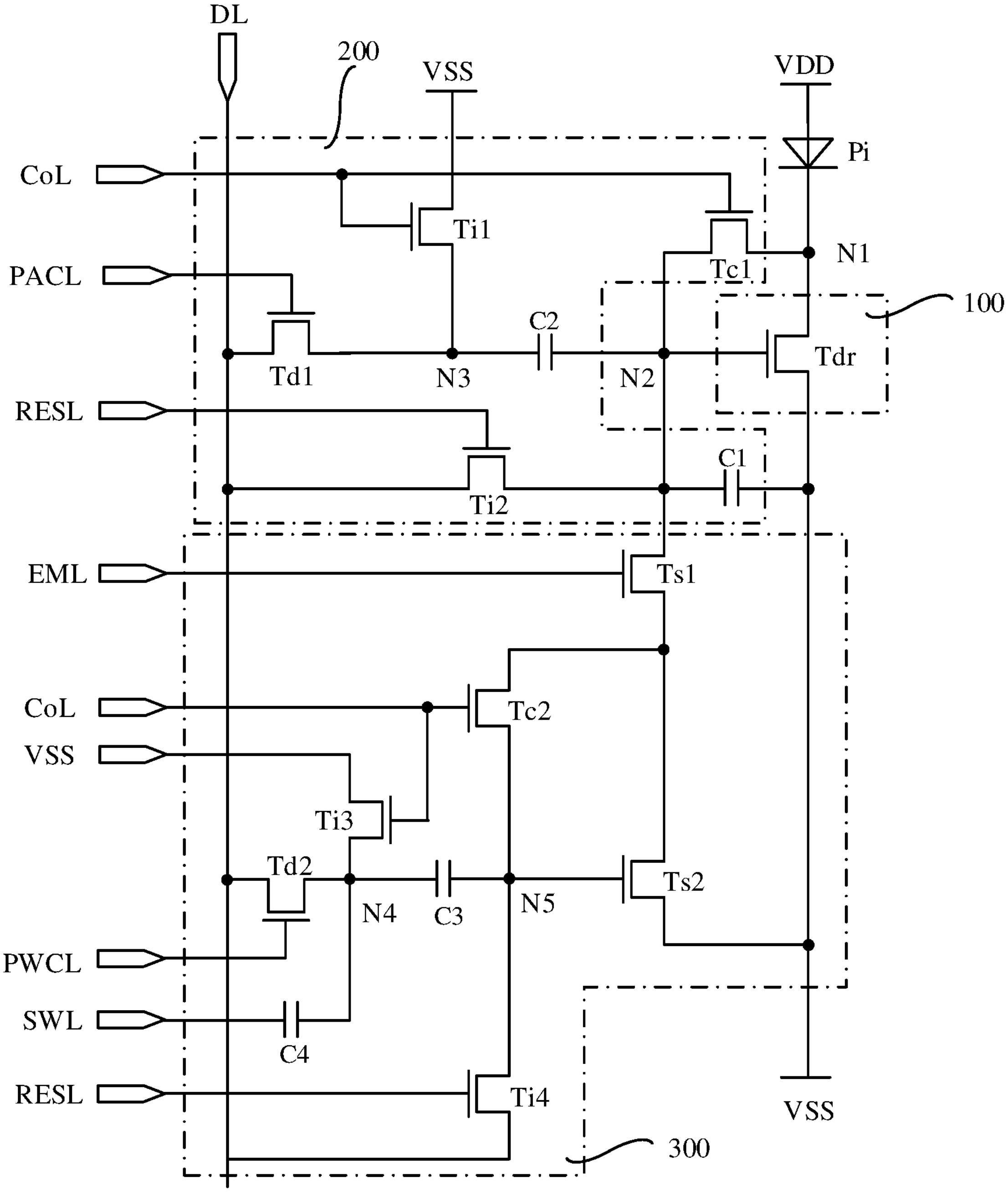

Optionally, continue to refer to FIG. 1E, the first voltage terminal VDD is directly electrically connected to the anode of the light emitting device Pi. In order to prevent the light emitting device Pi from erroneously emitting light, the first voltage signal Vdd transmitted by the first voltage terminal VDD has a first voltage value during the phase when the first switching transistor Ts1 is turned on (i.e., the light emitting phase). The first voltage signal Vdd has a second voltage value during a phase when the first switching transistor Ts1 is turned off (i.e., a non-light emitting phase). The first voltage value is greater than the second voltage value.

It can be understood that when the first voltage terminal VDD is directly electrically connected to the anode of the light emitting device Pi, the control terminal of the first reset transistor Ti1 may be electrically connected to the first reset control line VIL. The control terminal of the first reset transistor Ti1 may also be electrically connected to the control terminal of the first compensation transistor Tc1. The control terminal of the first reset transistor Ti1 may also be electrically connected to the control terminal of the second reset transistor Ti2.

The present invention also provides a driving method of a pixel driving circuit, which is used to drive any of the above-mentioned pixel driving circuits, including transmitting the pulse amplitude modulation voltage VPAM to the driving module 100 through the pulse amplitude modulation module 200, such that the driving module 100 controls the amplitude of the driving current according to the pulse amplitude modulation voltage VPAM; and receiving the sweep voltage Sweep through the pulse width modulation module 300 to control a moment when the driving transistor Tdr stops outputting the driving current and control the duration of the driving transistor Tdr outputting the driving current.

Figure 2A:
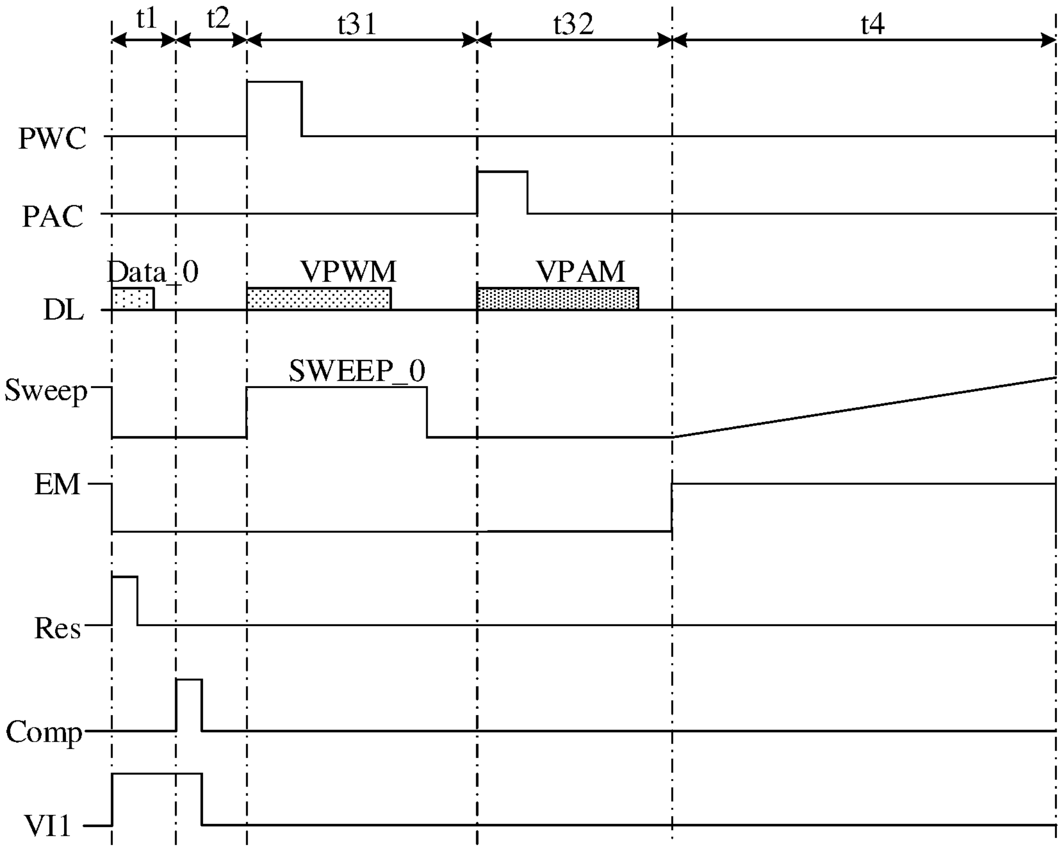
FIG. 2A to FIG. 2C are timing diagrams provided by embodiments of the present invention.
Figure 2B:
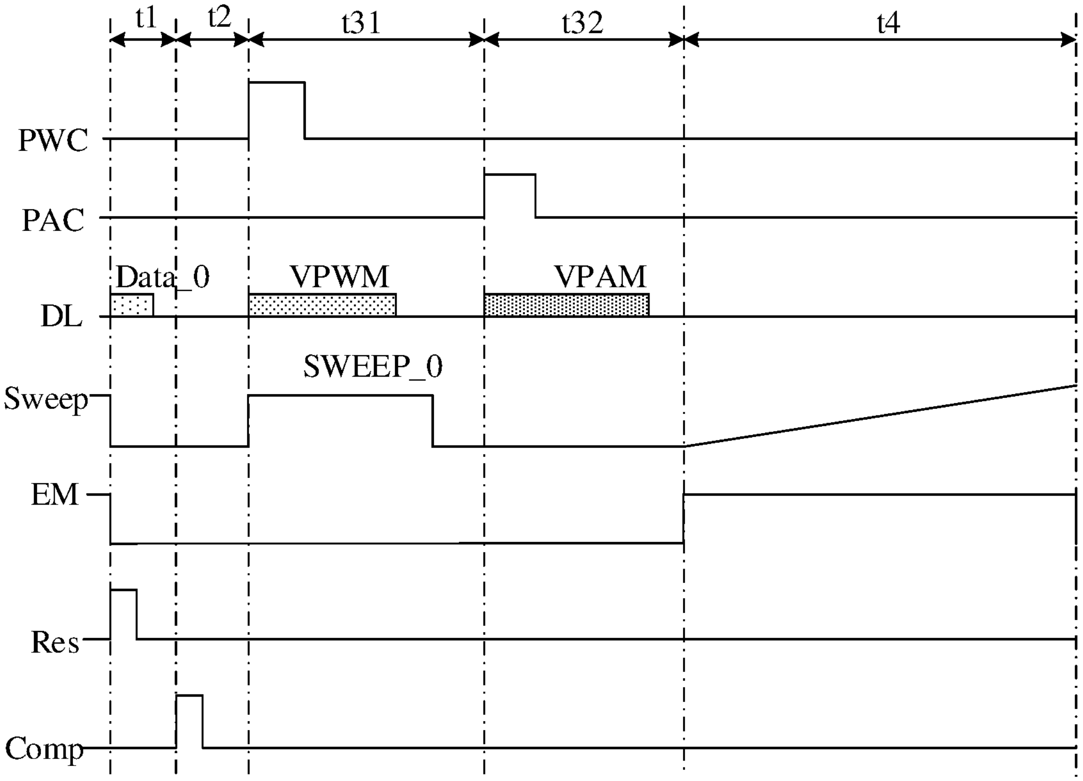
Figure 2C:
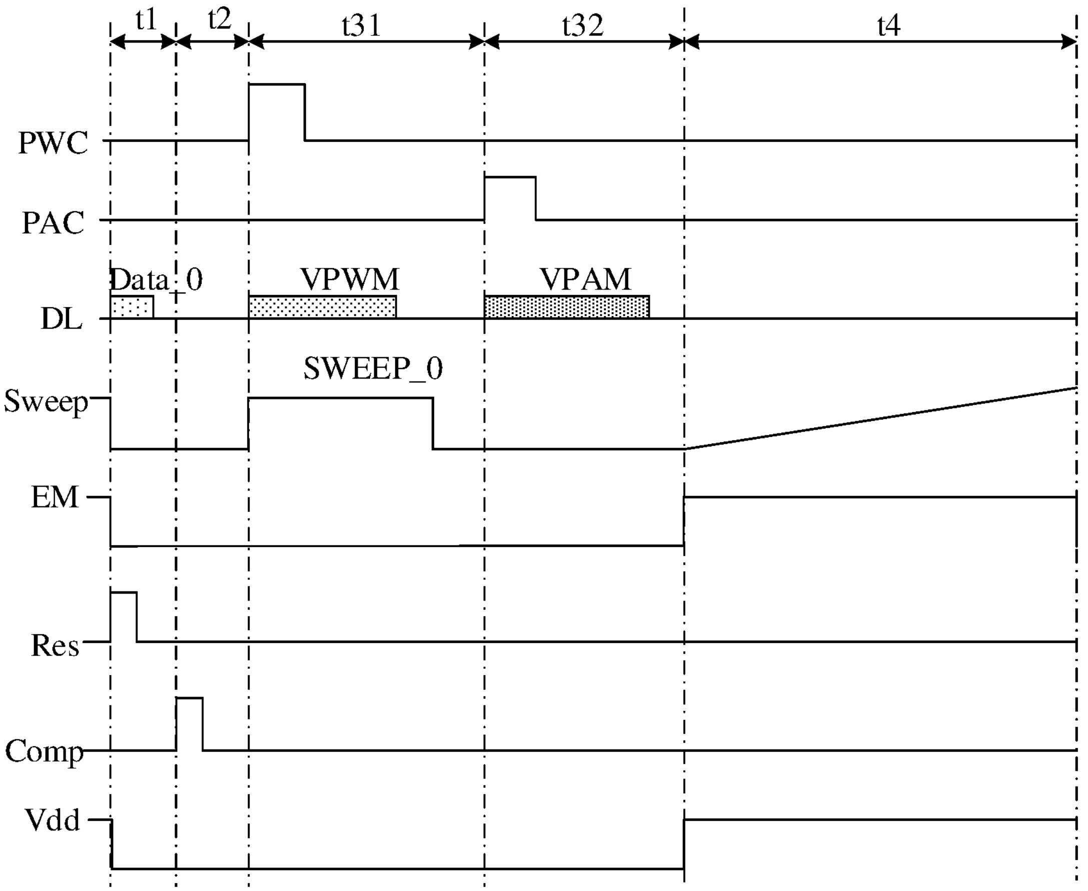

FIG. 2A to FIG. 2C are timing diagrams provided by embodiments of the present invention. FIG. 2A is a timing diagram corresponding to the pixel driving circuit shown in FIG. 1B. FIG. 2B is a timing diagram corresponding to the pixel driving circuit shown in FIG. 1C to FIG. 1D. FIG. 2C is a timing diagram corresponding to the pixel driving circuit shown in FIG. 1E.

Assuming that each transistor included in the pixel driving circuit is N-type, the working principle of the pixel driving circuit shown in FIG. 1A to FIG. 1E will be explained in conjunction with the timing diagrams shown in FIG. 2A to FIG. 2C. The operation cycle of driving the pixel driving circuit includes a reset phase t1, a detection compensation phase t2, a data writing phase, and a light emitting phase t4.

In the reset phase t1, the second reset control signal Res is at high potential. The lighting control signal EM, the pulse width control signal PWC, the pulse amplitude control signal PAC and the compensation control signal Comp are at low potential. The second reset transistor Ti2 and the fourth reset transistor Ti4 are turned on, and the data line DL transmits the first reset voltage Data_0 to the control terminal of the second switching transistor Ts2 (i.e., the fifth node N5) and the control terminal of the driving transistor Tdr. (That is, the second node N2). This causes the potential of the fifth node N5 and the potential of the second node N2 to become the first reset voltage Data_0, realizing adjustment of the potential of the control terminal of the second switching transistor Ts2 and the control terminal of the driving transistor Tdr. Because the first reset voltage Data_0 is at a high potential, the second switching transistor Ts2 and the driving transistor Tdr are turned on.

In the pixel driving circuit shown in FIG. 1B, the first reset control signal VI1 is high potential. In the pixel driving circuit shown in FIG. 1D, the first reset control signal VI1 (i.e., the second reset control signal Res) is at high potential. In the pixel driving circuit shown in FIG. 1B and FIG. 1D, the first reset transistor Ti1 is turned on according to the first reset control signal VI1, and the second voltage signal Vss is transmitted to the third node N3 to reset the third node N3. This eliminates the potential information remaining at the third node N3 in the previous frame. In the pixel driving circuit shown in FIG. 1C, the first reset control signal VI1 (i.e., the compensation control signal Comp) is at low potential, and the first reset transistor Ti1 is turned off.

In the detection compensation phase t2, the compensation control signal Comp is at high potential. The second reset control signal Res, the lighting control signal EM, the pulse width control signal PWC and the pulse amplitude control signal PAC are at low potential. The first compensation transistor Tc1, the second compensation transistor Tc2, and the third reset transistor Ti3 are turned on according to the compensation control signal Comp. The driving transistor Tdr and the second switching transistor Ts2 are turned on during the reset phase t1, therefore, the potential of the second node N2 decreases under the action of the second voltage signal Vss until the voltage of the second node N2 is equal to the sum of the second voltage signal Vss and the threshold voltage of the driving transistor Tdr (that is, VN2=Vss+Vth_Tdr; where Vth_Tdr represents the threshold voltage of the driving transistor Tdr), the driving transistor Tdr is turned off. The third reset transistor Ti3 is turned on, such that the fourth node N4 is reset by the second voltage signal Vss. The potential of the control terminal of the second switching transistor Ts2 decreases under the action of the second voltage signal Vss, until the voltage of the second node N2 is equal to the sum of the second voltage signal Vss and the threshold voltage of the driving transistor Tdr (that is, VN5=Vss+Vth_Ts2; where Vth_Ts2 represents the threshold voltage of the second switching transistor Ts2), the second switching transistor Ts2 is turned off.

In the pixel driving circuit shown in FIG. 1B, the first reset control signal VI1 is at high potential. The first reset transistor Ti1 remains on to continue to reset the third node N3 through the second voltage signal Vss. This eliminates the potential information of the second node N2 left in the previous frame and prevents the threshold voltage of the driving transistor Tdr from being written into the second node N2. This ensures that the driving transistor Tdr can be fully compensated during the light emitting phase t4. In the pixel driving circuit shown in FIG. 1C, the first reset control signal VI1 (i.e., the compensation control signal Comp) is at high potential. The first reset transistor Ti1 is turned on. The third node N3 is reset through the second voltage signal Vss to eliminate the potential information remaining at the third node N3 in the previous frame. In the pixel driving circuit shown in FIG. 1D, the first reset control signal VI1 (i.e., the second reset control signal Res) is at low potential. The first reset transistor Ti1 is turned off, so that the third node N3 is in a floating state. When the voltage at the second node N2 changes from Data_0 in the reset stage t1 to Vth_Tdr-Data_0+Vss in the detection compensation stage t2, the voltage difference between the third node N3 and the second node N2 needs to be constant. This causes the voltage at the third node N3 to be affected by the voltage change at the second node N2 and change from Vss to Vth_Tdr-Data_0+2Vss.

The data writing phase includes a pulse width modulation voltage writing phase t31 and a pulse amplitude modulation voltage writing phase t32.

In the pulse width modulation voltage writing phase t31, the pulse width control signal PWC is at high potential. The second reset control signal Res, the lighting control signal EM, the pulse amplitude control signal PAC, and the compensation control signal Comp are at low potential. The second data transistor Td2 is turned on according to the pulse width control signal PWC, and the pulse width modulation voltage VPWM is transmitted to the fourth node N4 through the data line DL. The frequency sweep voltage Sweep transmitted by the frequency sweep control line SWL is SWEEP_0. Therefore, the voltage difference across the fourth capacitor C4 is VPWM-SWEEP_0. Afterwards, the pulse width control signal PWC turns to a low potential, the second data transistor Td2 is turned off, and the voltage difference across the fourth capacitor C4 is maintained at VPWM-SWEEP_0. Then, the sweep voltage decreases from SWEEP_0 to 0V, so that the voltage of the fourth node N4 is coupled from VPWM to VPWM-SWEEP_0 via the fourth capacitor C4. The voltage of the fifth node N5 is coupled from Vth_Ts2+Vss to Vth_Ts2+Vss+VPWM-SWEEP_0 via the third capacitor C3. Therefore, the potential difference between the control terminal of the second switching transistor Ts2 and the sweep control line SWL is Vth_Ts2+Vss+VPWM-SWEEP_0. In order to make the second switching transistor Ts2 non-conductive, Vth_Ts2+Vss+VPWM-SWEEP_0 needs to be less than the threshold voltage of the second switching transistor Ts2.

In the pulse amplitude modulation voltage writing phase t32, the pulse amplitude control signal PAC is at high potential. The second reset control signal Res, the lighting control signal EM, the pulse width control signal PWC, and the compensation control signal Comp are low level. The first data transistor Td1 is turned on according to the pulse amplitude control signal PAC. The pulse amplitude modulation voltage VPAM is transmitted to the third node N3 via the data line DL, so that the voltage at the third node N3 becomes C4*VPAM/(C1+C4). The potential of the second node N2 becomes Vth_Tdr+C4*VPAM/(C1+C4) through the coupling of the second capacitor C2.

In the pixel driving circuit shown in FIG. 1B, the first reset control signal VI1 is at low potential during the data writing phase, and the first reset transistor Ti1 is turned off. In the pixel driving circuit shown in FIG. 1C, the first reset control signal VI1 (i.e., the compensation control signal Comp) is at low potential, and the first reset transistor Ti1 is turned off. In the pixel driving circuit shown in FIG. 1D, the first reset control signal VI1 (i.e., the second reset control signal Res) is at low potential. The first reset transistor Ti1 is turned off, and the voltage of the third node N3 is VPAM during the pulse amplitude modulation voltage writing phase t32. The change value of the voltage of the third node N3 during the data writing phase relative to the reset phase t1 is VPAM-Vth_Tdr+Data_0-2Vss. The voltage change value of the second node N2 is Vth_Tdr+Vss+C4*the voltage change value of the third node/(C1+C4).

In the pixel driving circuit shown in FIG. 1E, in order to avoid false light emission of the light emitting device Pi, the first voltage transmitted by the first voltage terminal VDD has a second voltage value in the reset phase t1, the detection compensation phase t2, and the data writing phase.

In the light emitting phase t4, the lighting control signal EM is at high potential. The second reset control signal Res, the pulse width control signal PWC, the compensation control signal Comp, and the pulse amplitude control signal PAC are low potential. The first switching transistor Ts1 is turned on. In the pixel driving circuit shown in FIG. 1B to FIG. 1D, the third switching transistor Ts3 is turned on. The driving transistor Tdr generates a driving current to drive the light emitting device Pi to emit light. In the pixel driving circuit shown in FIG. 1E, the first voltage signal Vdd transmitted by the first voltage terminal VDD has a first voltage value. This causes the driving transistor Tdr to generate a driving current to drive the light emitting device Pi to emit light.

In the light emitting phase t4, the driving transistor Tdr operates in the saturation region. In the pixel driving circuit shown in FIG. 1B, the driving current I flowing through the driving transistor $Tdr=[\mu Cox\ (W/L)(Vg-Vs-Vth)^2]/2=[\mu Cox\ (W/L)(C4*VPAM/(C1+C4)-Vss)^2]/2$. Therefore, the driving current is independent of the threshold voltage of the driving transistor Tdr and the threshold voltage of the second switching transistor Ts2. Correspondingly, it can also be found that the driving current corresponding to the pixel driving circuit shown in FIG. 1C to FIG. 1E has nothing to do with the threshold voltage of the driving transistor Tdr.

The sweep voltage Sweep may gradually increase during the light emitting phase t4. This causes the potential of the control terminal of the second switching transistor Ts2 to continuously increase. Until the potential of the control terminal of the second switching transistor Ts2 is raised to the point where the second switching transistor Ts2 can be turned on, the second voltage signal Vss transmitted by the second voltage terminal VSS is transmitted to the second node N2 through the second switching transistor Ts2 and the first switching transistor Ts1. As a result, the driving transistor Tdr is turned off, and the light emitting device Pi is controlled to stop emitting light.

In a pixel driving circuit and a driving method thereof provided by embodiments of the present invention, by combining pulse width modulation and pulse amplitude modulation, the driving current is not affected by the threshold voltage, which improves display uniformity and eliminates the need for external compensation circuits. This is conducive to keeping power consumption low and can reduce the impact of process differences and long-term driving sensitivity on the display performance.

Figure 3:
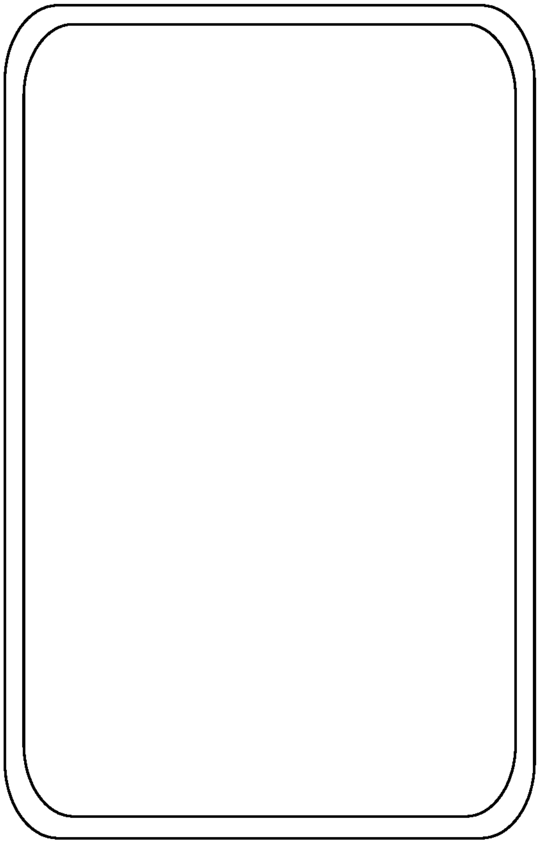
FIG. 3 is a schematic structural diagram of a display panel provided by an embodiment of the present invention.

FIG. 3 is a schematic structural diagram of a display panel provided by an embodiment of the present invention. The present invention also provides a display panel including any of the above-mentioned pixel driving circuits.

Optionally, the display panel includes a passive light-emitting display panel (such as a liquid crystal display panel, etc.), and the light-emitting device Pi included in the pixel driving circuit can be used as a backlight source.

Optionally, the display panel includes a self-luminous display panel, and the light-emitting device Pi included in the pixel driving circuit can be used for sub-pixels.

This description uses specific examples to illustrate the principles and implementation methods of the present invention. The description of the above embodiments is only used to help understand the method and its core idea of the present invention. In addition, for those skilled in the art, there may be changes in the specific implementation and application scope based on the ideas of the present invention. In summary, the contents of this description should not be construed as limitations of the present invention.

The invention claimed is:

1. A pixel driving circuit, comprising:

a light emitting device electrically connected between a first node and a first voltage terminal;

a driving transistor electrically connected to the first node, a second node, and a second voltage terminal, wherein the driving transistor is configured to generate a driving current to drive the light emitting device to emit light;

a pulse amplitude modulation subcircuit electrically connected to the driving transistor and configured to output a pulse amplitude modulation voltage to the driving transistor to control an amplitude of the driving current; and a pulse width modulation subcircuit electrically connected to the second node, the second voltage terminal, and the pulse amplitude modulation subcircuit and configured to control a duration of the driving transistor outputting the driving current according to a sweep voltage, wherein the driving transistor has a control terminal electrically connected to the second node, an input terminal electrically connected to the light emitting device, and an output terminal electrically connected to the second voltage terminal; and wherein the pulse amplitude modulation subcircuit comprises:

a first compensation transistor having a control terminal electrically connected to a compensation control line, an input terminal electrically connected to the first node, and an output terminal electrically connected to the second node;

a first reset transistor having a control terminal electrically connected to a first reset control line, an input terminal electrically connected to the second voltage terminal, and an output terminal electrically connected to a third node;

a first data transistor having a control terminal electrically connected to a pulse amplitude control line, an input terminal electrically connected to a data line, and an output terminal electrically connected to the third node;

a first capacitor connected in series between the second node and the second voltage terminal;

a second capacitor connected in series between the second node and the third node; and a second reset transistor having a control terminal electrically connected to a second reset control line, an input terminal electrically connected to the data line, and an output terminal electrically connected to the second node.

2. The pixel driving circuit according to claim 1, wherein the control terminal of the first reset transistor is electrically connected to the control terminal of the second reset transistor through the first reset control line; or the control terminal of the first reset transistor is electrically connected to the control terminal of the first compensation transistor through the first reset control line.

3. The pixel driving circuit according to claim 1, wherein the pulse width modulation subcircuit comprises:

a first switching transistor, wherein a control terminal of the first switching transistor is electrically connected to a light emitting control line, and an output terminal of the first switching transistor is electrically connected to the second node;

a second switching transistor, wherein an input terminal of the second switching transistor is electrically connected to the second voltage terminal, and an output terminal of the second switching transistor is electrically connected to an input terminal of the first switching transistor;

a second compensation transistor, wherein a control terminal of the second compensation transistor is electrically connected to the compensation control line, and an input terminal and an output terminal of the second compensation transistor are electrically connected between the output terminal and a control terminal of the second switching transistor;

a third reset transistor, wherein a control terminal of the third reset transistor is electrically connected to the control terminal of the second compensation transistor, an input terminal of the third reset transistor is electrically connected to the second voltage terminal, and an output terminal of the third reset transistor is electrically connected to a fourth node;

a second data transistor, wherein a control terminal of the second data transistor is electrically connected to a pulse width control line, an input terminal of the second data transistor is electrically connected to the data line, and an output terminal of the second data transistor is electrically connected to the fourth node;

a third capacitor connected in series between the fourth node and the control terminal of the second switching transistor; and a fourth capacitor connected in series between a sweep control line for transmitting the sweep voltage and the fourth node.

4. The pixel driving circuit according to claim 3, wherein the pulse width modulation subcircuit further comprises:

a fourth reset transistor, wherein a control terminal of the fourth reset transistor is electrically connected to the second reset control line, an input terminal of the fourth reset transistor is electrically connected to the data line, and an output terminal of the fourth reset transistor is electrically connected to the control terminal of the second switching transistor.

5. The pixel driving circuit according to claim 3, wherein a first voltage signal transmitted by the first voltage terminal has a first voltage value when the first switching transistor is turned on, and the first voltage signal has a second voltage value when the first switching transistor is turned off; and wherein the first voltage value is greater than the second voltage value.

6. The pixel driving circuit according to claim 1, further comprising:

a third switching transistor, wherein a control terminal of the third switching transistor is electrically connected to a light emitting control line, and an input terminal and an output terminal of the third switching transistor are electrically connected between the first voltage terminal and the light emitting device.

7. A driving method of a pixel driving circuit, wherein the pixel driving circuit comprises:

a light emitting device electrically connected between a first node and a first voltage terminal;

a driving transistor electrically connected to the first node, a second node, and a second voltage terminal, wherein the driving transistor is configured to generate a driving current to drive the light emitting device to emit light;

a pulse amplitude modulation subcircuit electrically connected to the driving transistor and configured to output a pulse amplitude modulation voltage to the driving transistor to control an amplitude of the driving current; and a pulse width modulation subcircuit electrically connected to the second node, the second voltage terminal, and the pulse amplitude modulation subcircuit and configured to control a duration of the driving transistor outputting the driving current according to a sweep voltage, wherein the driving transistor has a control terminal electrically connected to the second node, an input terminal electrically connected to the light emitting device, and an output terminal electrically connected to the second voltage terminal;

wherein the pulse amplitude modulation subcircuit comprises:

a first compensation transistor having a control terminal electrically connected to a compensation control line, an input terminal electrically connected to the first node, and an output terminal electrically connected to the second node;

a first reset transistor having a control terminal electrically connected to a first reset control line, an input terminal electrically connected to the second voltage terminal, and an output terminal electrically connected to a third node;

a first data transistor having a control terminal electrically connected to a pulse amplitude control line, an input terminal electrically connected to a data line, and an output terminal electrically connected to the third node;

a first capacitor connected in series between the second node and the second voltage terminal;

a second capacitor connected in series between the second node and the third node; and a second reset transistor having a control terminal electrically connected to a second reset control line, an input terminal electrically connected to the data line, and an output terminal electrically connected to the second node; and wherein the driving method of the pixel driving circuit comprises:

transmitting the pulse amplitude modulation voltage to the driving transistor through the pulse amplitude modulation subcircuit, such that the driving transistor controls the amplitude of the driving current according to the pulse amplitude modulation voltage; and receiving the sweep voltage through the pulse width modulation subcircuit to control a moment when the driving transistor stops outputting the driving current and control the duration of the driving transistor outputting the driving current.

8. The driving method of the pixel driving circuit according to claim 7, wherein an operation cycle of driving the pixel driving circuit comprises a reset phase, a detection and compensation phase, a data writing phase, and a light emitting phase, wherein during the reset phase, the driving transistor is turned on, a first voltage signal transmitted by the first voltage terminal has a second voltage value in the reset phase, the detection compensation phase, and the data writing phase; wherein in the light emitting phase, the first voltage signal transmitted by the first voltage terminal has a first voltage value.

9. The driving method of the pixel driving circuit according to claim 8, wherein the first voltage value is greater than the second voltage value.

10. A display panel, comprising:

a pixel driving circuit comprising:

a light emitting device electrically connected between a first node and a first voltage terminal;

a driving transistor electrically connected to the first node, a second node, and a second voltage terminal, wherein the driving transistor is configured to generate a driving current to drive the light emitting device to emit light;

a pulse amplitude modulation subcircuit electrically connected to the driving transistor and configured to output a pulse amplitude modulation voltage to the driving transistor to control an amplitude of the driving current; and a pulse width modulation subcircuit electrically connected to the second node, the second voltage terminal, and the pulse amplitude modulation subcircuit and configured to control a duration of the driving transistor outputting the driving current according to a sweep voltage, wherein the driving transistor has a control terminal electrically connected to the second node, an input terminal electrically connected to the light emitting device, and an output terminal electrically connected to the second voltage terminal; and wherein the pulse amplitude modulation subcircuit comprises:

a first compensation transistor having a control terminal electrically connected to a compensation control line, an input terminal electrically connected to the first node, and an output terminal electrically connected to the second node;

a first reset transistor having a control terminal electrically connected to a first reset control line, an input terminal electrically connected to the second voltage terminal, and an output terminal electrically connected to a third node;

a first data transistor having a control terminal electrically connected to a pulse amplitude control line, an input terminal electrically connected to a data line, and an output terminal electrically connected to the third node;

a first capacitor connected in series between the second node and the second voltage terminal;

a second capacitor connected in series between the second node and the third node; and a second reset transistor having a control terminal electrically connected to a second reset control line, an input terminal electrically connected to the data line, and an output terminal electrically connected to the second node.

11. The display panel according to claim 10, wherein the control terminal of the first reset transistor is electrically connected to the control terminal of the second reset transistor through the first reset control line; or the control terminal of the first reset transistor is electrically connected to the control terminal of the first compensation transistor through the first reset control line.

12. The display panel according to claim 10, wherein the pulse width modulation subcircuit comprises:

a first switching transistor, wherein a control terminal of the first switching transistor is electrically connected to a light emitting control line, and an output terminal of the first switching transistor is electrically connected to the second node;

a second switching transistor, wherein an input terminal of the second switching transistor is electrically connected to the second voltage terminal, and an output terminal of the second switching transistor is electrically connected to an input terminal of the first switching transistor;

a second compensation transistor, wherein a control terminal of the second compensation transistor is electrically connected to the compensation control line, and an input terminal and an output terminal of the second compensation transistor are electrically connected between the output terminal and a control terminal of the second switching transistor;

a third reset transistor, wherein a control terminal of the third reset transistor is electrically connected to the control terminal of the second compensation transistor, an input terminal of the third reset transistor is electrically connected to the second voltage terminal, and an output terminal of the third reset transistor is electrically connected to a fourth node;

a second data transistor, wherein a control terminal of the second data transistor is electrically connected to a pulse width control line, an input terminal of the second data transistor is electrically connected to the data line, and an output terminal of the second data transistor is electrically connected to the fourth node;

a third capacitor connected in series between the fourth node and the control terminal of the second switching transistor; and a fourth capacitor connected in series between a sweep control line for transmitting the sweep voltage and the fourth node.

13. The display panel according to claim 12, wherein the pulse width modulation subcircuit further comprises:

a fourth reset transistor, wherein a control terminal of the fourth reset transistor is electrically connected to the second reset control line, an input terminal of the fourth reset transistor is electrically connected to the data line, and an output terminal of the fourth reset transistor is electrically connected to the control terminal of the second switching transistor.

14. The display panel according to claim 12, wherein a first voltage signal transmitted by the first voltage terminal has a first voltage value when the first switching transistor is turned on, and the first voltage signal has a second voltage value when the first switching transistor is turned off; and wherein the first voltage value is greater than the second voltage value.

15. The display panel according to claim 10, wherein the pixel driving circuit further comprises:

a third switching transistor, wherein a control terminal of the third switching transistor is electrically connected to a light emitting control line, and an input terminal and an output terminal of the third switching transistor are electrically connected between the first voltage terminal and the light emitting device.

* * * * *